US012069730B2

(12) United States Patent
Ying et al.

(10) Patent No.: US 12,069,730 B2
(45) Date of Patent: Aug. 20, 2024

(54) SECONDARY PHYSICAL RANDOM ACCESS CHANNEL (PRACH) CONFIGURATION FOR CONTENTION BASED RANDOM ACCESS IN NEW RADIO SYSTEMS

(71) Applicant: Apple Inc., Cupertino, CA (US)

(72) Inventors: Dawei Ying, Portland, OR (US); Lili Wei, Portland, OR (US); Qian Li, Beaverton, OR (US); Hassan Ghozlan, Hillsboro, OR (US); Geng Wu, Portland, OR (US)

(73) Assignee: Apple Inc., Cupertino, CA (US)

( * ) Notice: Subject to any disclaimer, the term of this patent is extended or adjusted under 35 U.S.C. 154(b) by 576 days.

(21) Appl. No.: 17/286,548

(22) PCT Filed: Oct. 30, 2019

(86) PCT No.: PCT/US2019/058887
§ 371 (c)(1),
(2) Date: Apr. 19, 2021

(87) PCT Pub. No.: WO2020/092585
PCT Pub. Date: May 7, 2020

(65) Prior Publication Data
US 2021/0385868 A1 Dec. 9, 2021

Related U.S. Application Data

(60) Provisional application No. 62/754,503, filed on Nov. 1, 2018.

(51) Int. Cl.
*H04W 74/00* (2009.01)
*H04W 74/0833* (2024.01)

(52) U.S. Cl.
CPC ..... *H04W 74/0833* (2013.01); *H04W 74/006* (2013.01); *H04W 74/008* (2013.01)

(58) Field of Classification Search
CPC .......................... H04W 74/006; H04W 74/008
(Continued)

(56) References Cited

U.S. PATENT DOCUMENTS

| 2014/0036747 A1 | 2/2014 | Nory et al. |
| 2018/0049190 A1 | 2/2018 | Abedini et al. |

(Continued)

FOREIGN PATENT DOCUMENTS

WO        2018165202 A1    9/2018

OTHER PUBLICATIONS

PCT Search Report dated Feb. 20, 2020 in connection with PCT Application No. PCT/US2019/058887.
(Continued)

*Primary Examiner* — Angel T Brockman
(74) *Attorney, Agent, or Firm* — Eschweiler & Potashnik, LLC

(57) ABSTRACT

A device of a New Radio (NR) evolved Node B (gNodeB), a method and a machine readable medium to implement the method. The method includes: processing a first signal sent by a NR evolved NodeB (gNodeB) regarding a primary physical random access channel (PRACH) configuration to be used to encode for transmission a first communication to the gNodeB; processing a second signal sent by the gNodeB regarding a secondary PRACH configuration different from the primary PRACH configuration and to be used to encode for transmission a second communication to the gNodeB; determining the primary PRACH configuration from the first signal and the secondary PRACH from the second signal; and switching from the primary PRACH configuration to the secondary PRACH configuration and encode for transmission the second communication to the gNodeB based on the secondary PRACH configuration.

21 Claims, 7 Drawing Sheets

(58) Field of Classification Search
USPC .......................................................... 370/329
See application file for complete search history.

(56) References Cited

U.S. PATENT DOCUMENTS

| | | |
|---|---|---|
| 2018/0049490 A1 | 2/2018 | Lim |
| 2018/0092139 A1 | 3/2018 | Novlan et al. |
| 2018/0115940 A1 | 4/2018 | Abedini et al. |
| 2018/0192412 A1 | 7/2018 | Novlan et al. |
| 2018/0192443 A1 | 7/2018 | Novlan et al. |

OTHER PUBLICATIONS

PCT Written Opinion dated Feb. 20, 2020 in connection with PCT Application No. PCT/US2019/058887.
Samsung, Necessary Enhancements for NR IAB, R1-1810864, 3GPP TSG RAN WG1 Meeting #94bis, Chengdu, China, Sep. 28, 2018 Sections 2.1, 2.4; and figure1.
Nokia et al., NR enhancements to support IAB, R1-1810673, 3GPP TSG RAN WG1 Meeting #94bis, Chengdu, China, Sep. 28, 2018 Section 2.3.
Catt, NR Physical Layer design for IAB backhaul link, R1-1810538, 3GPP TSG RAN WG1 Meeting #94bis, Chengdu, China, Sep. 28, 2018 Section 2.3 ; and figure 3.
AT&T; 4-Step RA Procedure for NR; 3GPP TSG RAN WG1 Meeting #88; R1-1702256; Feb. 13, 2017.
Samsung; Necessary Enhancements for NR IAB; 3GPP TSG RAN WG1 Meeting #94b; R1-1810864; Oct. 8, 2018.
3rd Generation Partnership Project; Technical Specification Group Radio Access Network; NR; Medium Access Control (MAC) protocol specification (Release 15); 3GPP TS 38.321 V15.2.0 (Jun. 2018); http://www.3gpp.org.

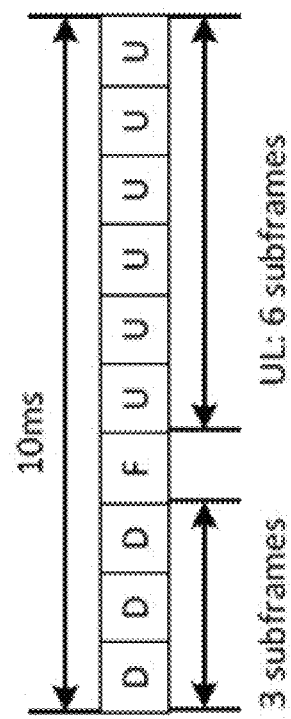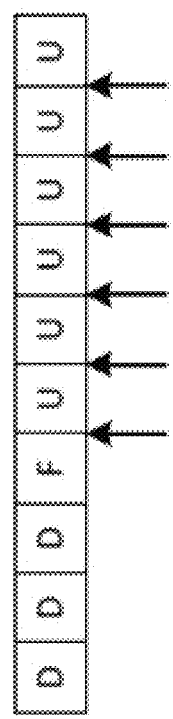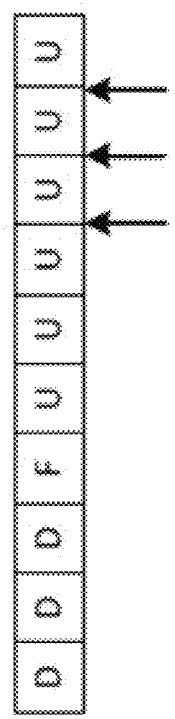

SECONDARY PHYSICAL RANDOM ACCESS CHANNEL (PRACH) CONFIGURATION FOR CONTENTION BASED RANDOM ACCESS IN NEW RADIO SYSTEMS

CROSS REFERENCE TO RELATED APPLICATIONS

This application is a National Phase entry application of International Patent Application No. PCT/US2019/058887 filed Oct. 30, 2019, which claims the benefit of and priority from U.S. Provisional Patent Application No. 62/754,503 entitled "Secondary PRACH configuration for contention based random access in 5G NR Release-16," filed Nov. 1, 2018, the entire disclosure of which is incorporated herein by reference.

FIELD

Various embodiments generally relate to the field of cellular communications, and particularly to the use of physical random access channel (PRACH) in a cellular network.

BACKGROUND

Current Third Generation Partnership Project (3GPP) New Radio (NR) specifications (or 5G specifications) do not specifically address issues related to the use of PRACH in integrated access and backhaul (IAB) scenarios, or in scenarios involving remote interference.

BRIEF DESCRIPTION OF THE DRAWINGS

FIG. 2A illustrates a time division duplexing (TDD) downlink (DL)/uplink (UL) radio frame;

FIG. 2B illustrates a FR1 time division duplexing (TDD) downlink (DL)/uplink (UL) radio frame implementing secondary PRACH according to one embodiment;

FIG. 2C illustrates a FR2 time division duplexing (TDD) downlink (DL)/uplink (UL) radio frame implementing secondary PRACH according to another embodiment;

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

NR may include enhancements to physical random access channel (PRACH). Embodiments include enhancement for contention based random access with a secondary PRACH configuration. The enhancement may be utilized in multiple scenarios.

Figure 1:
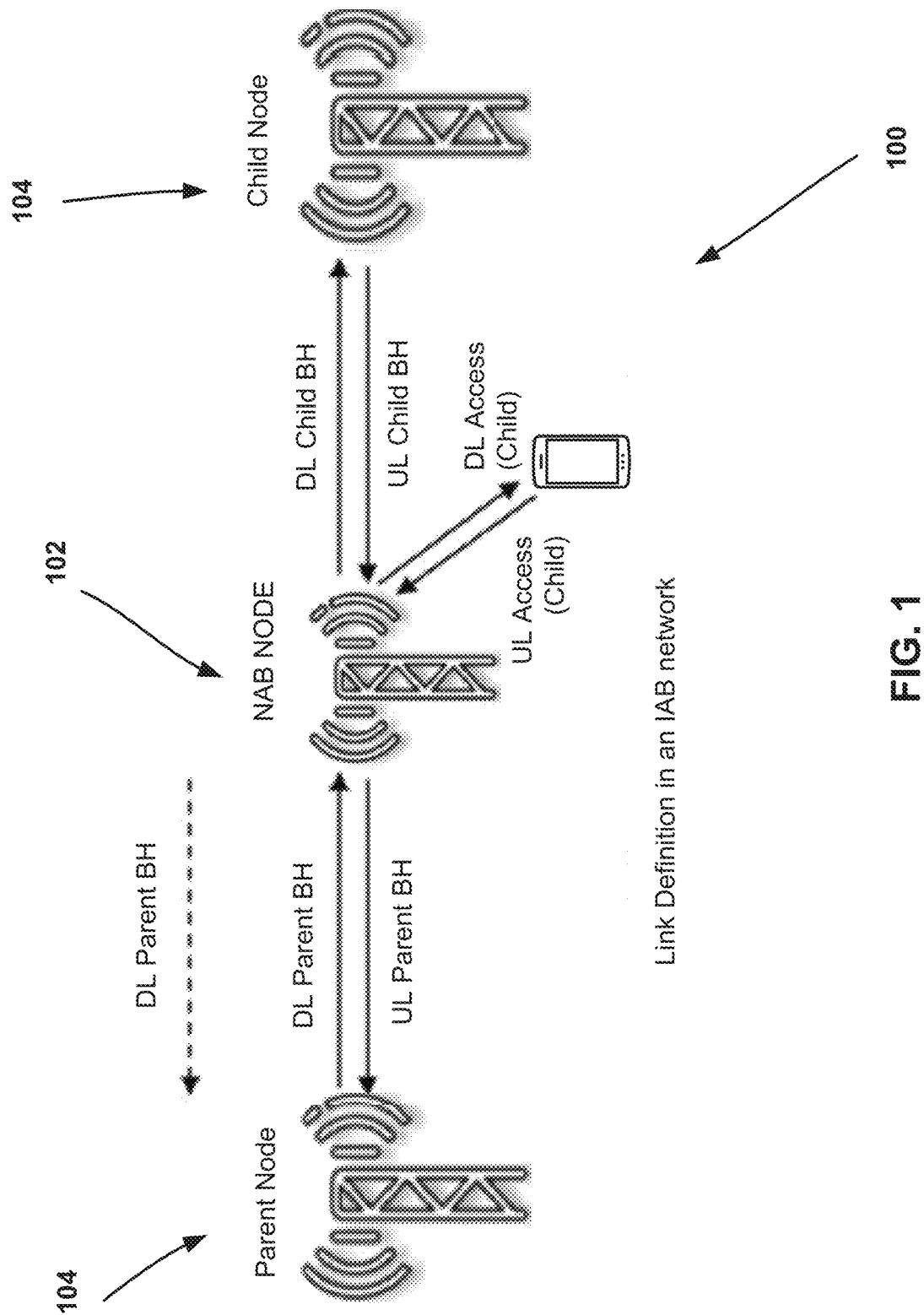
FIG. 1 illustrates an example IAB network.

One of the use cases associated with embodiments is in an integrated access and backhaul (IAB) network. FIG. 1 demonstrates a portion of a cellular communication network 100 including an IAB node 102, a parent IAB node 104, a UE 106, and a child IAB node 108. IAB node is configured to serve as the access node for the child UE 106 for downlink (DL) and uplink (UL) communication that an IAB node may sometimes have both child IAB nodes (IAB nodes that use that IAB node for backhaul) and UEs attached to it for access. IAB node 102 is configured for downlink (DL) and uplink (UL) communication with parent node 104 and child node 108 for backhaul, and with UE 106 for access. It is desirable to configure orthogonal PRACH resources at an IAB for child IAB nodes (such as child node 108) and UEs (such as UE 106), so that the collision between backhaul and access links in contention based random access is reduced.

If child IAB nodes and UEs share the same synchronization signal block (SSB) from the IAB node, then the IAB node can configure its UEs to use the existing (primary) PRACH resource and its child IAB nodes to use secondary PRACH resource. If the two PRACH resource (the primary PRACH resource and the secondary PRACH resource) are orthogonal, there is no collision between backhaul and access random access.

Another use case for the secondary PRACH configuration is in remote interference management (RIM). When remote interference (RI) occurs due to atmospheric duct effects, the closer the UL symbol is to the DL/UL switching guard period (GP), the higher the chance of interference being suffered in a victim cell. Therefore, it is desirable to use a PRACH resource that is close in time to the end of the semi-static DL/UL period when RI happens. Embodiments herein include secondary PRACH to be configured to UEs in the victim cell as the fallback PRACH configuration. A UE first may, according to this embodiment, use a primary PRACH resource for random access, and switch to the secondary PRACH resource configuration due to RI by virtue of active signaling from the network, or by virtue of having too much failed random access attempts with the primary PRACH.

Some embodiments present a random access channel (RACH) configuration extension and related signaling to enable secondary PRACH configuration for contention based random access.

Some embodiments present secondary PRACH configuration for nodes (IAB nodes or UEs). The PRACH enhancement can be utilized in a NR IAB network to reduce collisions between access links and child backhaul links in random access scenarios (e.g., one PRACH configuration for access links and anther PRACH configuration for child backhaul links), and it can also be used in NR RIM to improve random access performance when RI occurs (e.g., by allowing the use of a secondary PRACH configuration when the primary PRACH configuration suffers from high failure rate due to RI).

RACH Configuration Extension with a Secondary PRACH Configuration

According to an embodiment, a cell-specific PRACH resource configuration for random access in the primary cell (PCell) may be signaled in Remaining Minimum System Information Block Type 1 (RMSI) (SIB1). For other serving cells, cell-specific PRACH configurations may be signaled to the UE via dedicated radio resource control (RRC) signaling. In another embodiment, an additional RRC field, rach-ConfigCommon2, may be defined in BWP-Uplink-Common, as a part of RMSI (SIB1) to signal the secondary PRACH configuration for the initial bandwidth part (BWP) of the PCell. The BWP-UplinkCommon signal may according to the latter embodiment be configured as noted below:

```
BWP-UplinkCommon :: = SEQUENCE {
    genericParamters          BWP,
    rach-ConfigCommon         SetupRelease { RACH-ConfigCommon },
OPTIONAL
    rach-ConfigCommon2        SetupRelease { RACH-
ConfigCommonSecondary }, OPTIONAL
    pusch-ConfigCommon        SetupRelease { PUSCH-ConfigCommon },
OPTIONAL
    pucch-ConfigCommon        SetupRelease { PUCCH-ConfigCommon },
OPTIONAL
    ...
}
``` with the below related field description:

| |
|---|
| RACH-ConfigCommon |
| Existing PRACH configuration for UEs |
| rach-ConfigCommonSecondary |
| Secondary PRACH configuration for IAB nodes or UEs. |

The additional RRC information element (IE) RACH-ConfigCommonSecondary as shown above may be used to specify the cell specific random-access parameters for the secondary PRACH configuration. The RRC IE may also be carried by BWP-UplinkCommon in a cell-specific uplink configuration for one or more other serving cell.

According to one embodiment, if the secondary PRACH is used for IAB child nodes, for the purpose of collision reduction between access and child backhaul links as suggested above for example in the context of the scenario in FIG. 1, it is desirable to configure orthogonal resources for RACH-ConfigCommon and RACH-ConfigCommon2. For example, the following PRACH configurations may be used with indices 41 and 42 which are orthogonal in FR2 (mm-Wave range) time division duplexing (TDD) operation:

| PRACH Config. Index | Preamble format | $n_{SFN} \bmod x = y$ | | Slot number | Starting symbol | Number of PRACH slots within a 60 kHz slot | $N_t^{RA, slot}$, number of time-domain PRACH occasions within a PRACH slot | $N_{dur}^{RA}$, PRACH duration |
|---|---|---|---|---|---|---|---|---|
| | | x | y | | | | | |
| 41 | A2 | 1 | 0 | 19, 39 | 5 | 1 | 2 | 4 |
| 42 | A2 | 1 | 0 | 3, 5, 7 | 0 | 1 | 3 | 4 |

According to another embodiment, the orthogonality between two PRACH configuration as noted by way of example above may be achieved with node-specific PRACH configurations. For example, in the following table, configuration x is based on configuration 41 with one slot offset as shown in the "Slot number" column. Then it is possible to use configuration 41 for primary PRACH, and configuration x is used for secondary PRACH:

| PRACH Config. Index | Preamble format | $n_{SFN}$ mod x = y | | Slot number | Starting symbol | Number of PRACH slots within a 60 kHz slot | $N_t^{RA, slot}$, number of time-domain PRACH occasions within a PRACH slot | $N_{dur}^{RA}$, PRACH duration |
|---|---|---|---|---|---|---|---|---|
| | | x | y | | | | | |
| 41 | A2 | 1 | 0 | 19, 39 | 5 | 1 | 2 | 4 |
| x | A2 | 1 | 0 | 18, 38 | 5 | 1 | 2 | 4 |

According to one embodiment, if the secondary PRACH is used as a RIM fallback option, for the purpose of providing a backup PRACH configuration to combat remote interference, the secondary PRACH resource may be configured in a subframe/symbol within a given semi-static DL/UL period.

Reference is now made to FIGS. 2A-2C, which show, respectively, TDD DL/UL radio frames 200a, 200b and 200c, each occurring within a period of 10 ms in a semi-static DL/UL configuration. Radio frames 200a/200b/200c include DL subframes (D), uplink subframes (U), and switching subframes (F) which switching frames include downlink and uplink time regions separated by a guard period (GP) for downlink to uplink switching. As shown in FIG. 2B, for a FR1 TDD radio frame 200b, PRACH configuration index 157 may be used as the primary configuration, with a subframe number of 4 as also shown by way of the arrows in FIG. 2B showing the secondary PRACH configuration as having been used for the UL subframes. As shown in FIG. 2C, PRACH configuration index 158 may be used as the secondary PRACH configuration with a subframe number of 4 as also shown by way of the arrows in FIG. 2C showing the secondary PRACH configuration as having been used for the UL subframes.

| PRACH Config. Index | Preamble format | $n_{SFN}$ mod x = y | | Subframe number | Starting symbol | Number of PRACH slots within a subframe | $N_t^{RA, slot}$, number of time-domain PRACH occasions within a PRACH slot | $N_{dur}^{RA}$, PRACH duration |
|---|---|---|---|---|---|---|---|---|
| | | x | y | | | | | |
| 157 | B4 | 1 | 0 | 4 | 0 | 1 | 1 | 12 |
| 158 | B4 | 1 | 0 | 7 | 0 | 1 | 1 | 12 |

Configurable Usage of the Secondary PRACH Configuration

In one embodiment, compared with the existing RACH-ConfigCommon IE, the secondary PRACH configuration IE may have two additional optional fields: ue-CapabilityRAT-ContainerList and secondaryPRACH-ActiveConfig as shown below:

```
RACH-ConfigCommonSecondary ::= SEQUENCE {
  rach-ConfigGeneric              RACH-ConfigGeneric,
  totalNumberOfRA-Preambles                    INTEGER (1..63), OPTIONAL
  ssb-perRACH-OccasionAndCB-PreamblesPerSSB  CHOICE {
    oneEighth                                  ENUMERATED
      {n4,n8,n12,n16,n20,n24,n28,n32,n36,n40,n44,n48,n52,n56,n60,n64},
    oneFourth                                  ENUMERATED
```

```
    {n4,n8,n12,n16,n20,n24,n28,n32,n36,n40,n44,n48, n52,n56,n60,n64},
        oneHalf                    ENUMERATED
    {n4,n8,n12,n16,n20,n24,n28,n32,n36,n40,n44,n48, n52,n56,n60,n64},
        One                        ENUMERATED
    {n4,n8,n12,n16,n20,n24,n28,n32,n36,n40,n44,n48, n52,n56,n60,n64},
        two                        ENUMERATED
    {n4,n8,n12,n16,n20,n24,n28,n32},
        four                       INTEGER (1..16),
        eight                      INTEGER (1..8),
        sixteen                    INTEGER (1..4)
} OPTIONAL
    groupBconfigured               SEQUENCE {
    ra-Msg3SizeGroupA              ENUMERATED {b56, b144, b208, b256,
b282, b480, b640, b800, b1000, b72,
                                       spare6, spare5,spare4,
    spare3, spare2, spare1},
        messagePowerOffsetGroupB   ENUMERATED
{ minusinfinity, dB0, dB5, dB8, dB10, dB12, dB15, dB18},
        numberOfRA-PreamblesGroupA INTEGER (1..64)
} OPTIONAL
        ra-ContentionResolutionTimer           ENUMERATED { sf8,
sf16, sf24, sf32, sf40, sf48, sf56, sf64},
        rsrp-ThresholdSSB                      RSRP-Range
OPTIONAL
        rsrp-ThresholdSSB-SUL                  RSRP-Range OPTIONAL
        prach-RootSequenceIndex                CHOICE {
            l839                               INTEGER (0..837),
            l139                   INTEGER (0..137)
        },
        msg1-SubcarrierSpacing                 SubcarrierSpacing
OPTIONAL
        restrictedSetConfig                    ENUMERATED
{unrestrictedSet, restrictedSetTypeA, restrictedSetTypeB},
        msg3-transformPrecoder                 ENUMERATED {enabled}
OPTIONAL
        ue-CapabilityRAT-ContainerList         UE-CapabilityRAT-
Containerlist OPTIONAL
        secondaryPRACH-ActiveConfig            SecondaryPRACH-
ActiveConfig OPTIONAL
        ...
    }
``` with the below related field description:

ue-CapabilityRAT-ContainerList
specifies the UE category that is allowed to use the secondary PRACH configuration, it could be a UE or an IAB nodes
secondaryPRACH-ActiveConfig
specifies triggering criteria for a qualified to use the secondary PRACH configuration.

According to an embodiment, the usage of the secondary PRACH configuration such as shown above in the examples of FIGS. 2B and 2C is configurable via the additional RRC field UE-CapabilityRAT-ContainerList. The latter field may specify the UE category that is configured to use the secondary PRACH resource. As discussed previously, one usage of the secondary PRACH is to distinguish backhaul and access PRACH in IAB networks. Therefore, the UE category may be configured as an IAB node mobile terminated (MT), and with only IAB nodes' MT being able to use the secondary PRACH configuration for contention based random access. According to another/further embodiment, the secondary PRACH may be used as a fallback option when RI occurs.

According to an embodiment, the optional RRC IE SecondaryPRACH-ActiveConfig may specify the triggering condition for UEs to switch to the secondary PRACH configuration. In one embodiment, this triggering condition may be defined as:

```
SecondaryPRACH-ActiveConfig ::= SEQUENCE {
    failedAttempt-Threshold    INTERER (1..maxFailedAttempt),
OPTIONAL
    expirationTimer            ENUMERATED {s1000, m100, h10,
infinity}, OPTIONAL
    ...
}
``` with the following field description:

failedAttempt-Threshold
specifies after how many failed attempts on the primary PRACH configuration, the node is triggered to use the secondary PRACH configuration
expirationTimer
sets the value of the timer for the usage of the secondary PRACH configuration. The node switch back to the primary PRACH configuration after the timer expires. If the field is not configured, then the node uses the secondary PRACH configuration as the default one.

According to an embodiment, a UE may use the primary PRACH configuration for random access, and may switch to the secondary PRACH configuration after a specified number of failed attempts with the primary configuration. The UE may switch back to the primary configuration after the specified timer expires.

However, if SecondaryPRACH-ActiveConfig is configured by the network, the UE may expect the network to explicitly signal the switching timing to/from the secondary PRACH configuration, as discussed in the following section.

Explicit Signaling from Network to Inform Nodes to Switch Between Two PRACH Configurations.

The switching condition between two PRACH configurations may be specified in RRC as discussed in the previous section. Alternatively, according to one embodiment, the network may also send explicitly signal to UE to indicate which PRACH configuration UE should use.

SIB Message

In one embodiment, the switching signal may be conveyed in a system information (SI), SIB10, as follows, where the indication from the network may be specific to each serving cell, as noted below:

```
SIB10 ::= SEQUENCE {
    physCellId            PhysCellId,
    prach-Selection       ENUMERATED {primary, secondary},
        expirationTimer   ENUMERATED {s1000, m100, h10,
infinity}, OPTIONAL
    ...
}
``` where the field description is as follows:

```
physCellIndex
    specifies the physical cell ID
prach-Selection
    specifies which PRACH resource configuration should be used on the
    specified BWP
expirationTimer
    sets the value of the tinner for the usage of the secondary PRACH
    configuration. The node switch back to the primary PRACH configuration
    after the timer expires. If the field is not configured, then the node
    uses the secondary PRACH configuration as the default one.
```

Group-Common PDCCH

In one embodiment, the switching signal may be conveyed in a group-common PDCCH (GC-PDCCH). In the current NR specification, 4 types of GC-PDCCH are specified, including downlink control information (DCI) format 2_0 for dynamic slot format indication (SFI), DCI format 2_1 for pre-emption, DCI formats 2_2 and 2_3 for uplink power control. According to an embodiment, a DCI format 2_4 may be defined to inform the UE to switch to or from the secondary PRACH configuration. Multiple PRACH resource configuration indicators may transmitted by DCI format 2_4, such as PRACH indicator 1, PRACH indicator 2, . . . PRACH indicator N, and the cyclic redundancy check (CRC) may be scrambled by a radio network temporary identifier (RNTI), such as by a secondary random access (SRA)-RNTI. According to an embodiment, the UE may obtain the SRA-RNTI from higher layer. Each PRACH indicator indicates a number of resource blocks allocated to PRACH data for a cell.

Figure 3:
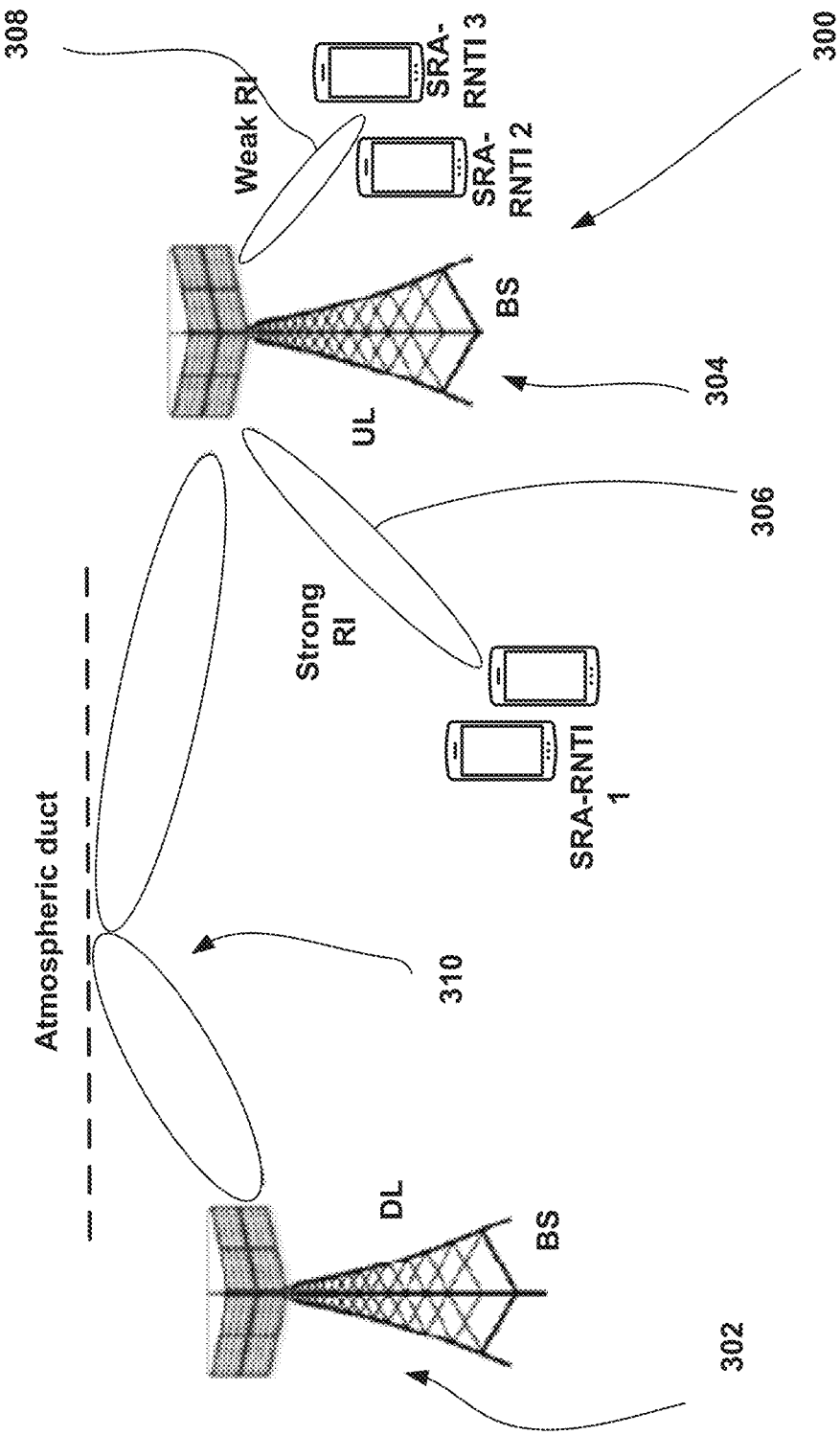
FIG. 3 illustrates a cellular network where secondary random access radio network temporary identifier (SRA-RNTI) is based on its corresponding uplink receiving beam according to one embodiment.

According to one embodiment, as shown in the example of FIG. 3, a network, such as network 300, may assign the SRA-RNTI based on its uplink receiving beam. In FIG. 3, two base stations 302 and 304 are part of cellular network 300. If the transmit/receive (Tx/Rx) Point (TRP), such as base station 304, can receive two UEs' uplink transmission using the same beam such as one having a strong rank indicator (RI) 306, then the same SRA-RNTI, SRA-RNTI 1, may be assigned to both UEs. If the TRP 304 cannot receive two UEs' uplink using the same beam, because of weak, RI, such as weak RI 308, then different SRA-RNTIs, SRA-RNTI 2 and SRA-RNTI3 may be respectively assigned to each of those UEs. When RI occurs, the victim cell TRP may experience different level of RI on various receive beams. According to an embodiment, the victim cell can use SRA-RNTI to inform a subset of its associated UEs, whose uplink endure high RI, such as RI at 310 by virtue of atmospheric ducting, to switch to the secondary PRACH resource configuration using the GC-PDCCH.

According to an embodiment, the size of DCI format 2_4 may be configured by higher layers, and each PRACH indicator within the DCI format 2_4 may informs a corresponding UE about whether to use the primary or secondary PRACH configuration on a specific serving cell. The mapping between the PRACH indicator and the serving cell may be provided by higher layers in a RRC serving cell configuration. In one embodiment, a RRC IE for PRACH indication and serving cell mapping may be defined as follows:

```
PDCCH-ServingCell ::= SEQUENCE {
    slotFormatIndicator
    SetupRelease{ SlotFormatIndicator }, OPTIONAL
    prachIndicator                SetupRelease{ PRACHIndicator},
OPTIONAL
    ...
}
PRACHIndicator :: = SEQUENCE {
    dci-PayloadSize               INTEGER (1..maxSRA-DCI-
PayloadSize),
        prachIndicatorToAddModList     SEQUENCE ( SIZE
(1..maxNrofCellsPerCellGroup)) of PRACHIndicatorPerCell, OPTIONAL
        prachIndicatorToRemoveList     SEQUENCE ( SIZE
(1..maxNrofCellsPerCellGroup)) of ServCellIndex, OPTIONAL
    ...
}
PRACHIndicatorPerCell ::= SEQUENCE{
    servingCellId                 ServCellIndex,
    positionInDCI                 INTEGER (0...maxSRA-DCI-PayloadSize -
1), OPTIONAL
    ...
}
```

UE-Specific RRC Signaling

In one embodiment, the switching signal may be conveyed in a UE-specific RRC message (such as a downlink-downlink control channel message (DL-DCCH-message)). Within the latter RRC message, a RRC IE may be defined as follows

```
PRACHSelectionPerCell ::= SEQUENCE {
    servCellIndex         ServCellIndex,
    prach-Selection       ENUMERATED {primary, secondary},
    ...
}
```

UE-Specific DCI Format/Field

In one embodiment, the switching signal may be conveyed in a field in DCI format 1_1 or another DCI format. The physical downlink control channel (PDCCH carrier) of this DCI may be scrambled by a cell RNTI (C-RNTI). The N-bit field, PRACH configuration indicator field (PCIF), may be used to indicate the PRACH configuration in the serving cell. Cross carrier (serving cell) indication may be possible according to an embodiment, and each bit in PCIF may correspond to a RRC configured cell ID. If the bit is 0, then UE uses the primary PRACH configuration in the serving cell. Otherwise, if the bit is 1, then UE uses the secondary PRACH configuration. In one embodiment, RRC IE for PRACH indication and serving cell mapping in PCIF is defined as follows:

```
PDCCH-Config ::= SEQUENCE {
    controlResourceSetToAddModList      SEQUENCE(SIZE (1..3)) OF
ControlResourceSet, OPTIONAL,
    controlResourceSetToReleaseList     SEQUENCE(SIZE (1..3)) OF
ControlResourceSetId, OPTIONAL,
    searchSpacesToAddModList            SEQUENCE(SIZE (1..10)) OF
SearchSpace, OPTIONAL,
    searchSpacesToReleaseList           SEQUENCE(SIZ.E (1..10)) OF
SearchSpaceId, OPTIONAL,
    downlinkPreemption                  SetupRelease
{ DownlinkPreemption }, OPTIONAL,
    tpc-PUSCH                           SetupRelease { PUSCH-TPC-
CommandConfig }, OPTIONAL,
    tpc-PUCCH                           SetupRelease { PUCCH-TPC-
CommandConfig }, OPTIONAL.
    tpc-SRS                             SetupRelease { SRS-TPC-
CommandConfig}, OPTIONAL,
    prachConfigIFList                   SEQUENCE(SIZE (1..maxNrofCells))
OF PRACHConfigIFList, OPTIONAL,
...
}
PRACHConfigIFList :: = SEQUENCE {
    servCellId                          ServCellIndex,
    positionInDCI                       INTEGER (1..N)
...
}
``` with the following field description:

| physCellIndex |
|---|
| specifies the serving cell ID |

MAC CE

Figure 4:
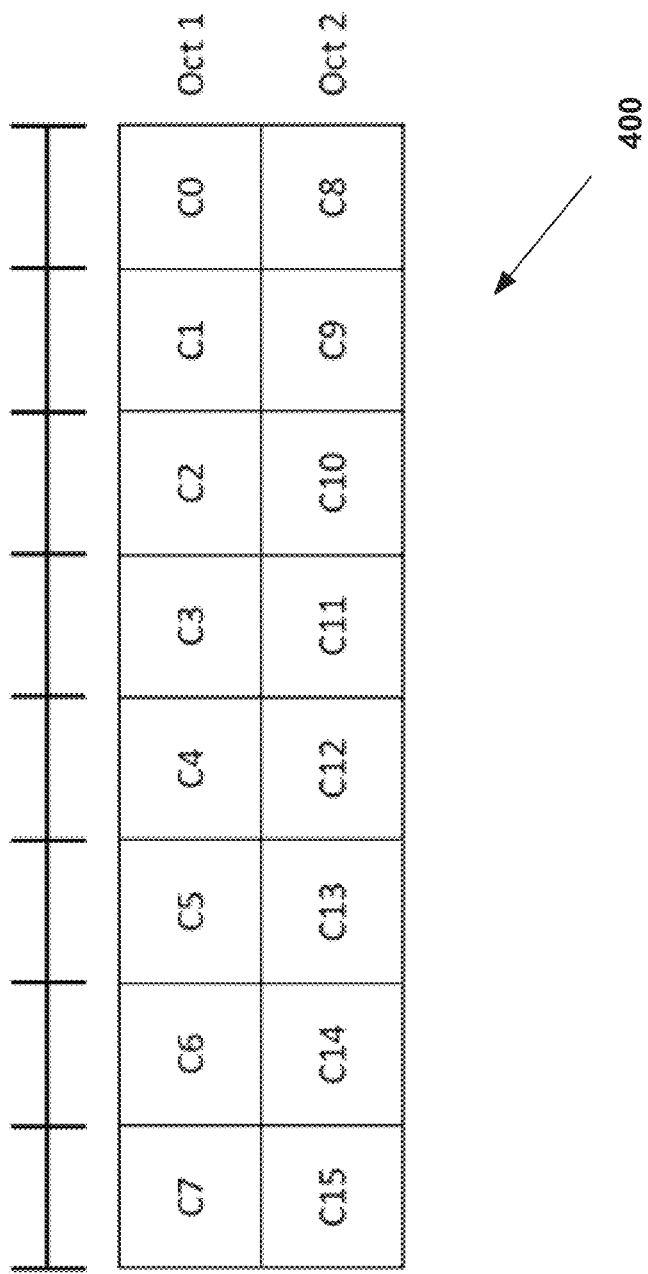
FIG. 4 illustrates a medium access control (MAC) control element (CE) according to one embodiment.

In one embodiment, the switching signal may be conveyed in a medium access control control element (MAC CE) using 10110 as the logical channel identifier (LCID) for the downlink shared channel (DL-SCH). DL-SCH is typically used to transmit system information blocks (SIBs), RRC signaling and application data. As shown in FIG. 4, the MAC CE may contain multiple octets, such as 2 octets, Oct 1 and Oct 2 in the case of the shown MAC CE 400, where each C-field corresponds to a serving cell. $C_0$ denotes PCell, and each of the other $C_i$ has its ServCellIndex. If a serving cell $C_i$ (with $C_i$, $i \neq 0$) is not configured or is deactivated, then $C_i$ is ignored by IAB nodes or UEs. If $C_i=0$, then UE should use the primary PRACH configuration in this serving cell. Otherwise, if $C_i=1$, then UE should use the secondary PRACH configuration.

Secondary System Information RNTI (SI-RNTI) for IAB-Specific Remaining Minimum SI (SystemInformationBlockType1) RMSI According to an embodiment, a PDCCH which is used to schedule physical downlink shared channel (PDSCH) for RMSI may scrambled by SI-RNTI. The current NR Release-15 has a single fixed SI-RNTI value as 0xFFFF as set forth in Table 7.1-1 of 3GPP TS 38.321 V15.2.0. In one embodiment, a second SI-RNTI value is defined as set forth in Table 5-1 below, which second SI-RNTI value may be used to scramble the PDCCH that schedules a RMSI only intended for IAB nodes.

TABLE 5-1

| SI-RNTI Value for IAB nodes | |
|---|---|
| Value (hexadecimal) | RNTI |
| 0000 | N/A |
| 0001-FFEF | RA-RNTI, Temporary C-RNTI, C-RNTI, CS-RNTI, TPC-PUCCH-RNTI, TPC-PUSCH-RNTI, TPC-SRS-RNTI, INT-RNTI, SFI-RNTI, and SP-CSI-RNTI |
| FFF0-FFFC | Reserved |
| FFFD | SI-RNTI (for IAB) |

TABLE 5-1-continued

SI-RNTI Value for IAB nodes

| Value (hexa-decimal) | RNTI |
|---|---|
| FFFE | P-RNTI |
| FFFF | SI-RNTI |

Figure 5:
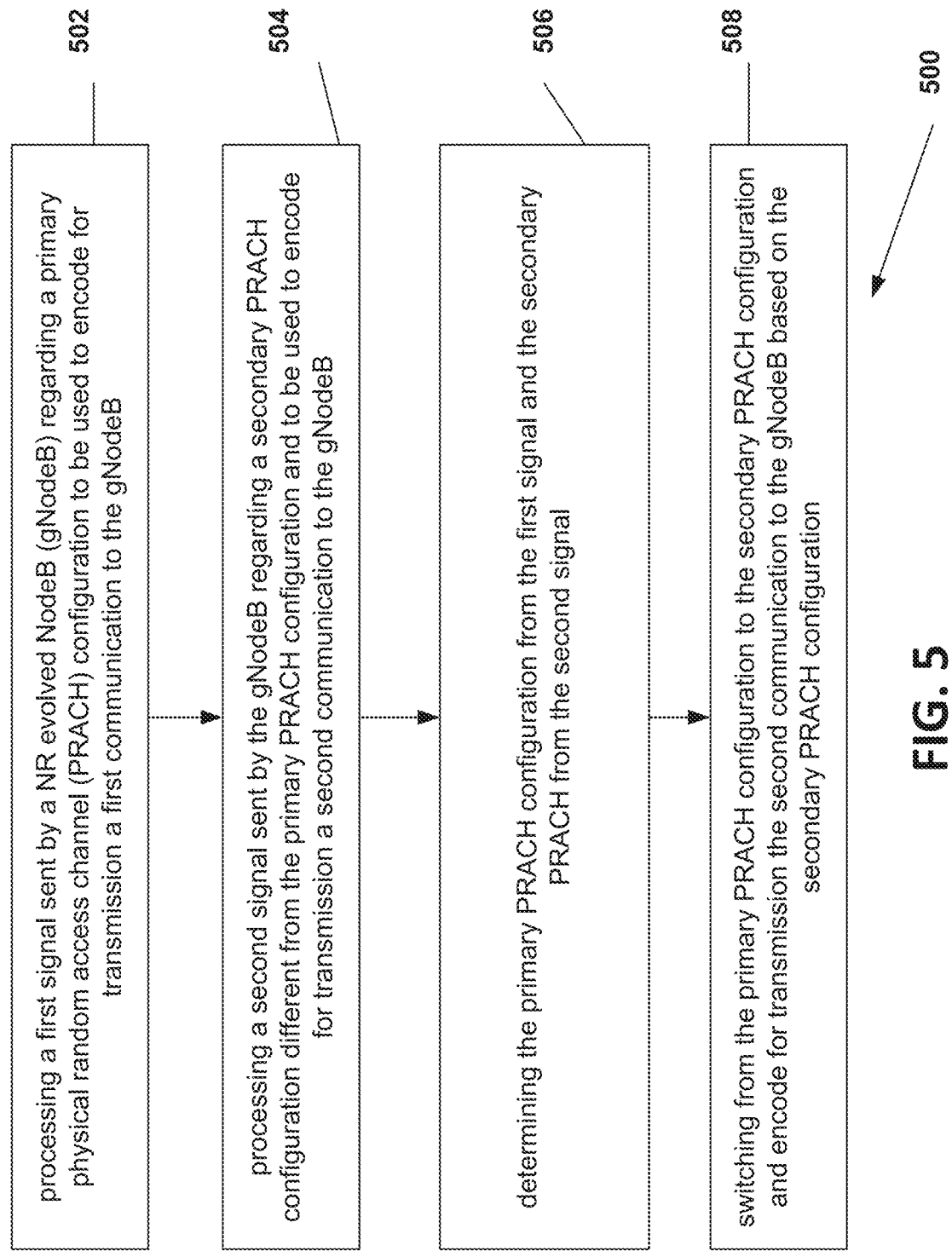
FIG. 5 is a process according to one embodiment.

FIG. 5 shows a process 500 according to an embodiment. Process 500 includes at operation 502, processing a first signal sent by a NR evolved NodeB (gNodeB) regarding a primary physical random access channel (PRACH) configuration to be used to encode for transmission a first communication to the gNodeB; at operation 504, processing a second signal sent by the gNodeB regarding a secondary PRACH configuration different from the primary PRACH configuration and to be used to encode for transmission a second communication to the gNodeB; at operation 506, determining the primary PRACH configuration from the first signal and the secondary PRACH from the second signal; and at operation 508, switching from the primary PRACH configuration to the secondary PRACH configuration and encode for transmission the second communication to the gNodeB based on the secondary PRACH configuration.

Figure 6:
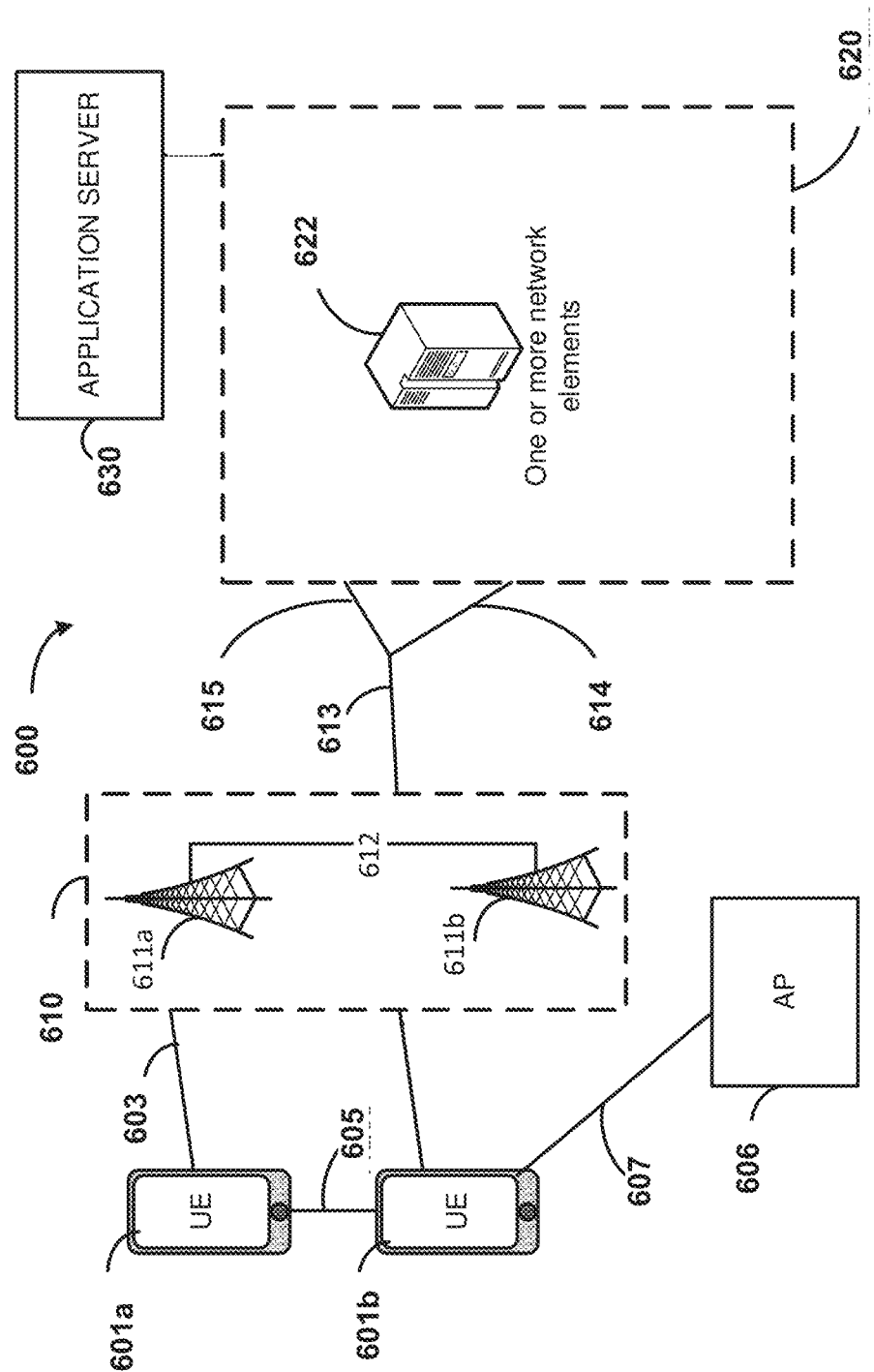
FIG. 6 illustrates an example architecture of a system of a network, in accordance with various embodiments.

FIG. 6 illustrates an example architecture of a system 600 of a network, in accordance with various embodiments. The following description is provided for an example system 600 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 6, the system 600 includes UE 601a and UE 601b (collectively referred to as "UEs 601" or "UE 601"). In this example, UEs 601 are illustrated as smartphones, but may also comprise any mobile or non-mobile computing device.

The UEs 601 may be configured to connect, for example, communicatively couple, with an or RAN 610. In embodiments, the RAN 610 may be an NG RAN or a 5G RAN, an E-UTRAN, or a legacy RAN, such as a UTRAN or GERAN. As used herein, the term "NG RAN" or the like may refer to a RAN 610 that operates in an NR or 5G system 600, and the term "E-UTRAN" or the like may refer to a RAN 610 that operates in an LTE or 4G system 600. The UEs 601 utilize connections (or channels) 603 and 604, respectively, each of which comprises a physical communications interface or layer (discussed in further detail below).

In this example, the connections 603 and 604 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 601 may directly exchange communication data via a ProSe interface 605. The ProSe interface 605 may alternatively be referred to as a SL interface 605 and may comprise one or more logical channels, including but not limited to a PSCCH, a PSSCH, a PSDCH, and a PSBCH.

The UE 601b is shown to be configured to access an AP 606 (also referred to as "WLAN node 606," "WLAN 606," "WLAN Termination 606," "WT 606" or the like) via connection 607. The connection 607 can comprise a local wireless connection, such as a connection consistent with any IEEE 802.11 protocol, wherein the AP 606 would comprise a wireless fidelity (Wi-Fi®) router. In this example, the AP 606 is shown to be connected to the Internet without connecting to the core network of the wireless system (described in further detail below).

The RAN 610 can include one or more AN nodes or RAN nodes 611a and 611b (collectively referred to as "RAN nodes 611" or "RAN node 611") that enable the connections 603 and 604. As used herein, the terms "access node," "access point," or the like may describe equipment that provides the radio baseband functions for data and/or voice connectivity between a network and one or more users. These access nodes can be referred to as BS, NR evolved NodeBs (gNodeBs), RAN nodes, eNBs, NodeBs, RSUs, TRxPs or TRPs, and so forth. As used herein, the term "NG RAN node" or the like may refer to a RAN node 611 that operates in an NR or 5G system 600 (for example, a gNB), and the term "E-UTRAN node" or the like may refer to a RAN node 611 that operates in an LTE or 4G system 600 (e.g., an eNB). According to various embodiments, the RAN nodes 611 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In embodiments, the UEs 601 can be configured to communicate using OFDM communication signals with each other or with any of the RAN nodes 611 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 611 to the UEs 601, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 601 and the RAN nodes 611, 612 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band").

The licensed spectrum may include channels that operate in the frequency range of approximately 400 MHz to approximately 3.8 GHz, whereas the unlicensed spectrum may include the 5 GHz band.

The RAN nodes 611 may be configured to communicate with one another via interface 612. In embodiments where the system 600 is a 5G or NR system, the interface 612 may be an Xn interface 612. The Xn interface is defined between two or more RAN nodes 611 (e.g., two or more gNodeBs or gNBs and the like) that connect to 5GC 620, between a RAN node 611 (e.g., a gNB) connecting to 5GC 620 and an eNB, and/or between two eNBs connecting to 5GC 620.

The RAN 610 is shown to be communicatively coupled to a core network—in this embodiment, core network (CN) 620. The CN 620 may comprise a plurality of network elements 622, which are configured to offer various data and telecommunications services to customers/subscribers (e.g., users of UEs 601) who are connected to the CN 620 via the RAN 610. The components of the CN 620 may be implemented in one physical node or separate physical nodes including components to read and execute instructions from a machine-readable or computer-readable medium (e.g., a non-transitory machine-readable storage medium).

Generally, the application server 630 may be an element offering applications that use IP bearer resources with the core network (e.g., UMTS PS domain, LTE PS data services, etc.). The application server 630 can also be configured to support one or more communication services (e.g., VoIP sessions, PTT sessions, group communication sessions, social networking services, etc.) for the UEs 601 via the EPC 620.

In embodiments, the CN 620 may be a 5GC (referred to as "5GC 620" or the like), and the RAN 610 may be connected with the CN 620 via an NG interface 613. In embodiments, the NG interface 613 may be split into two parts, an NG user plane (NG-U) interface 614, which carries traffic data between the RAN nodes 611 and a UPF, and the S1 control plane (NG-C) interface 615, which is a signaling interface between the RAN nodes 611 and AMFs.

In embodiments, the CN 620 may be a 5G CN (referred to as "5GC 620" or the like), while in other embodiments, the CN 620 may be an EPC. Where CN 620 is an EPC (referred to as "EPC 620" or the like), the RAN 610 may be connected with the CN 620 via an S1 interface 613. In embodiments, the S1 interface 613 may be split into two parts, an S1 user plane (S1-U) interface 614, which carries traffic data between the RAN nodes 611 and the S-GW, and the S1-MME interface 615, which is a signaling interface between the RAN nodes 611 and MMEs.

Figure 7:
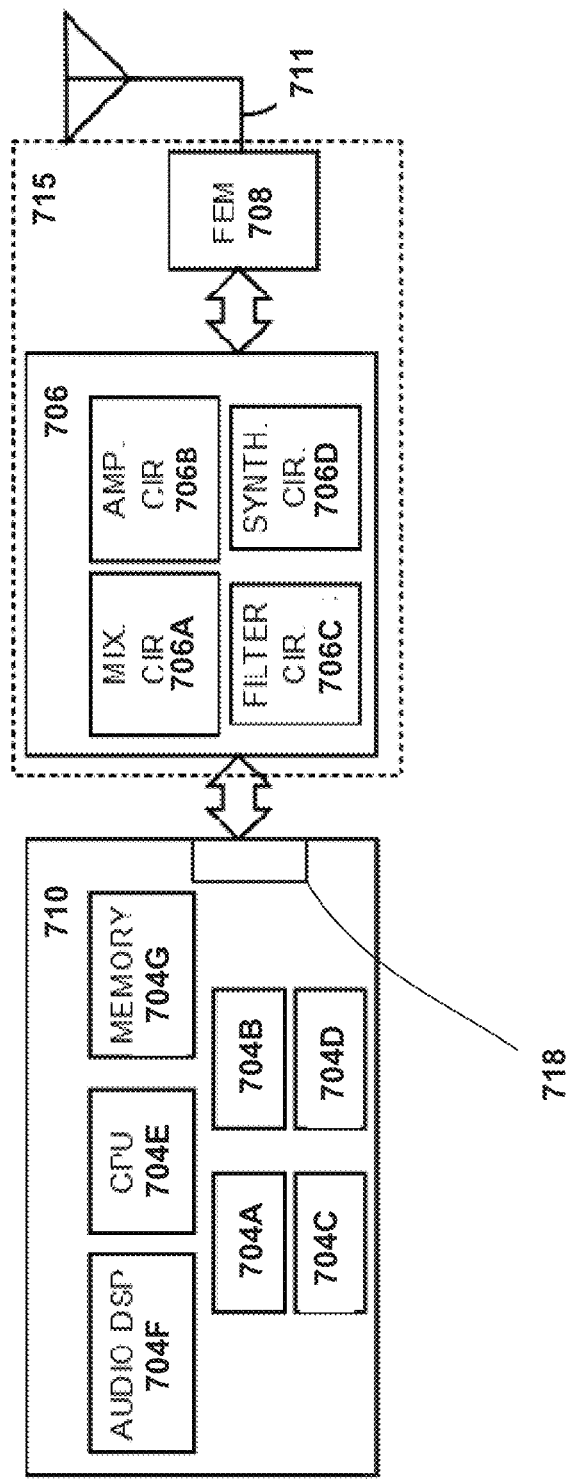
FIG. 7 illustrates example components of baseband circuitry and radio front end modules (RFEM) in accordance with various embodiments.

FIG. 7 illustrates example components of baseband circuitry 710 and radio front end modules (RFEM) 715 in accordance with various embodiments. Baseband circuitry 710 includes a RF interface 718 connecting it to the RFEM. As shown, the RFEMs 715 may include Radio Frequency (RF) circuitry 706, front-end module (FEM) circuitry 708, antenna array 711 coupled together at least as shown.

The baseband circuitry 710 includes circuitry and/or control logic configured to carry out various radio/network protocol and radio control functions that enable communication with one or more radio networks via the RF circuitry 706. The radio control functions may include, but are not limited to, signal modulation/demodulation, encoding/decoding, radio frequency shifting, etc. In some embodiments, modulation/demodulation circuitry of the baseband circuitry 710 may include Fast-Fourier Transform (FFT), precoding, or constellation mapping/demapping functionality. In some embodiments, encoding/decoding circuitry of the baseband circuitry 710 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 710 is configured to process baseband signals received from a receive signal path of the RF circuitry 706 and to generate baseband signals for a transmit signal path of the RF circuitry 706. The baseband circuitry 710 is configured to interface with an application circuitry for generation and processing of the baseband signals and for controlling operations of the RF circuitry 706. The baseband circuitry 710 may handle various radio control functions.

The aforementioned circuitry and/or control logic of the baseband circuitry 710 may include one or more single or multi-core processors. For example, the one or more processors may include a 3G baseband processor 704A, a 4G/LTE baseband processor 704B, a 5G/NR baseband processor 704C, or some other baseband processor(s) 704D for other existing generations, generations in development or to be developed in the future (e.g., sixth generation (6G), etc.). In other embodiments, some or all of the functionality of baseband processors 704A-D may be included in modules stored in the memory 704G and executed via a Central Processing Unit (CPU) 704E. In other embodiments, some or all of the functionality of baseband processors 704A-D may be provided as hardware accelerators (e.g., FPGAs, ASICs, etc.) loaded with the appropriate bit streams or logic blocks stored in respective memory cells. In various embodiments, the memory 704G may store program code of a real-time OS (RTOS), which when executed by the CPU 704E (or other baseband processor), is to cause the CPU 704E (or other baseband processor) to manage resources of the baseband circuitry 710, schedule tasks, etc. In addition, the baseband circuitry 710 includes one or more audio digital signal processor(s) (DSP) 704F. The audio DSP(s) 704F include elements for compression/decompression and echo cancellation and may include other suitable processing elements in other embodiments.

In some embodiments, each of the processors 704A-704E include respective memory interfaces to send/receive data to/from the memory 704G. The baseband circuitry 710 may further include one or more interfaces to communicatively couple to other circuitries/devices RF circuitry 706 may enable communication with wireless networks using modulated electromagnetic radiation through a non-solid medium.

In some embodiments, the receive signal path of the RF circuitry 706 may include mixer circuitry 706a, amplifier circuitry 706b and filter circuitry 706c. In some embodiments, the transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 710 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

FEM circuitry 708 may include a receive signal path, which may include circuitry configured to operate on RF signals received from antenna array 711, amplify the received signals and provide the amplified versions of the received signals to the RF circuitry 706 for further processing. FEM circuitry 708 may also include a transmit signal path, which may include circuitry configured to amplify signals for transmission provided by the RF circuitry 706 for transmission by one or more of antenna elements of antenna array 711. In various embodiments, the amplification through the transmit or receive signal paths may be done solely in the RF circuitry 706, solely in the FEM circuitry 708, or in both the RF circuitry 706 and the FEM circuitry 708.

The antenna array 711 comprises one or more antenna elements, each of which is configured convert electrical signals into radio waves to travel through the air and to convert received radio waves into electrical signals. For example, digital baseband signals provided by the baseband circuitry 710 is converted into analog RF signals (e.g., modulated waveform) that will be amplified and transmitted via the antenna elements of the antenna array 711 including one or more antenna elements (not shown). The antenna elements may be omnidirectional, direction, or a combination thereof. The antenna elements may be formed in a multitude of arranges as are known and/or discussed herein. The antenna array 711 may comprise microstrip antennas or printed antennas that are fabricated on the surface of one or more printed circuit boards. The antenna array 711 may be formed in as a patch of metal foil (e.g., a patch antenna) in a variety of shapes, and may be coupled with the RF circuitry 706 and/or FEM circuitry 708 using metal transmission lines or the like.

One or more of the components of FIGS. 6 and/or 7, may be used in any of the embodiments described herein.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The components of FIGS. 6 and/or 7, such as the shown baseband processing circuitry including processors a RF interface, may be used in any of the embodiments described herein, such as in a gNodeB or in a UE.

In some embodiments, the electronic device(s), network(s), system(s), chip(s) or component(s), or portions or implementations thereof, of FIG. 6 or 7, or some other figure herein, may be configured to perform one or more processes, techniques, or methods as described herein, or portions thereof. One such process is depicted in FIG. 5.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

In some embodiments, the electronic device(s), network(s), system(s), chip(s) or component(s), or portions or implementations thereof, of FIGS. 6 and 7, or some other figure herein, may be configured to perform one or more processes, techniques, or methods as described herein, or portions thereof. For example, the process may include receiving, by a signaling mechanism, an indication of a secondary physical random access channel (PRACH) configuration; and identifying the secondary PRACH configuration.

In some embodiments, the electronic device of FIGS. 6 and 7 may be configured to perform one or more processes, techniques, and/or methods as described herein, or portions thereof. For example, the process may include: determining an indication of a secondary physical random access channel (PRACH) configuration; and transmitting, by a signaling mechanism, the indication of the secondary PRACH configuration.

EXAMPLES

Example 1 includes a device of a wireless apparatus, the device including a Radio Frequency (RF) interface, and processing circuitry coupled to the RF interface, the processing circuitry to: process a first signal sent by a NR evolved NodeB (gNodeB) regarding a primary physical random access channel (PRACH) configuration to be used to encode for transmission a first communication to the gNodeB; process a second signal sent by the gNodeB regarding a secondary PRACH configuration different from the primary PRACH configuration and to be used to encode for transmission a second communication to the gNodeB; determine the primary PRACH configuration from the first signal and the secondary PRACH from the second signal; and switch from the primary PRACH configuration to the secondary PRACH configuration and encode for transmission the second communication to the gNodeB based on the secondary PRACH configuration.

Example 2 includes the subject matter of Example 1, and optionally, wherein the gNodeB is an integrated access and backhaul (IAB) parent node, and wherein the wireless apparatus is one of a NR User Equipment (UE) or an IAB child node.

Example 3 includes the subject matter of Example 1, and optionally, wherein the second signal is part of one of a radio resource control (RRC) signal, a system information (SI) signal, or a group-common physical downlink control channel (GC-PDCCH) signal.

Example 4 includes the subject matter of Example 1, and optionally, wherein the processing circuitry is to switch in response to at least one of: satisfaction of a triggering condition to switch; or explicit signaling from the gNodeB.

Example 5 includes the subject matter of Example 4, and optionally, wherein the triggering condition includes a determination as to whether a predetermined number of failed transmission attempts of the first communication to the gNodeB from the wireless apparatus have taken place using the primary PRACH configuration.

Example 6 includes the subject matter of Example 4, and optionally, wherein the explicit signaling is based on remote interference management (RIM) by the gNodeB.

Example 7 includes the subject matter of Example 4, and optionally, wherein the explicit signaling is part of one of: a system information (SI) radio resource control (RRC) message from the gNodeB; a group-common physical downlink control channel (PDCCH) including a downlink control information (DCI) format 2_4; a user equipment-specific (UE-specific) RRC message including a downlink downlink control channel message (DL-DCCH-message); a medium access control control channel (MAC CE); or a UE-specific DCI format.

Example 8 includes the subject matter of Example 7, and optionally, wherein: where the explicit signaling is part of the SI RRC message, the SI RRC message includes an cell-specific indication of a selection as between the primary PRACH configuration and the secondary PRACH configuration; where the explicit signaling is part of the DCI format 2_4, the DCI format 2_4 includes an indication of a selection as between the primary PRACH configuration and the secondary PRACH configuration that is for one user equipment (UE), or for a group of UEs from one or multiple serving cells; where the explicit signaling is part of the DL-DCCH-message, the DL-DCCH message includes a RRC information element (IE) to indicate a cell-specific selection as between the primary PRACH configuration and the secondary PRACH configuration; where the explicit signaling is part of the MAC CE, the MAC CE includes a 1-bit field to indicate a selection as between the primary PRACH configuration and the secondary PRACH configuration; and where the explicit signaling is part of the UE-specific DCI format, the UE-specific DCI format includes a selection as between the primary PRACH configuration and the secondary PRACH configuration for multiple serving cells.

Example 9 includes the subject matter of Example 8, and optionally, wherein, where the explicit signaling is part of the DCI format 2_4, the processing circuitry is to decode a cyclic redundancy check (CRC) based on a secondary random access (SRA) radio network temporary identifier (RNTI) (SRA-RNTI).

Example 10 includes the subject matter of Example 9, and optionally, wherein the processing circuitry is to determine the SRA-RNTI from higher layer signaling by the gNodeB.

Example 11 includes the subject matter of Example 1, and optionally, wherein the first signal and the second signal are both part of a cell-specific uplink configuration communication.

Example 12 includes the subject matter of Example 11, and optionally, wherein: for random access by the wireless apparatus in a primary cell (PCell), the second signal is part of an extended remaining minimum system information (RMSI) block (SIB1) sent by the gNodeB; for random access by the wireless apparatus in a serving cell other than the PCell, the second signal is part of a dedicated radio resource control (RRC) signaling sent by the gNodeB; and the processing circuitry is to switch based on the second signal.

Example 13 includes the subject matter of Example 11, and optionally, wherein the second signal includes information regarding a triggering condition to trigger a switch between the primary PRACH configuration and the secondary PRACH configuration, the processing circuitry to switch based on the triggering condition.

Example 14 includes the subject matter of Example 1, and optionally, wherein the processing circuitry is to use the secondary PRACH configuration to encode uplink (UL) slots within a semi-static downlink/uplink (DL/UL) period to avoid interference from remote cells.

Example 15 includes the subject matter of any one of Examples 1-14, and optionally, wherein further including a front-end module coupled to the processing circuitry.

Example 16 includes the subject matter of Example 15, and optionally, further including one or more antennas coupled to the front end module to transmit and receive signals to and from the gNodeB.

Example 17 includes a method to be implemented at a device of a wireless apparatus, the device including a Radio Frequency (RF) interface, and processing circuitry coupled to the RF interface, the method including: processing a first signal sent by a NR evolved NodeB (gNodeB) regarding a primary physical random access channel (PRACH) configuration to be used to encode for transmission a first communication to the gNodeB; processing a second signal sent by the gNodeB regarding a secondary PRACH configuration different from the primary PRACH configuration and to be used to encode for transmission a second communication to the gNodeB; determining the primary PRACH configuration from the first signal and the secondary PRACH from the second signal; and switching from the primary PRACH configuration to the secondary PRACH configuration and encode for transmission the second communication to the gNodeB based on the secondary PRACH configuration.

Example 18 includes the subject matter of Example 17, and optionally, wherein the gNodeB is an integrated access and backhaul (IAB) parent node, and wherein the wireless apparatus is one of a NR User Equipment (UE) or an IAB child node.

Example 19 includes the subject matter of Example 17, and optionally, wherein the second signal is part of one of a radio resource control (RRC) signal, a system information (SI) signal, or a group-common physical downlink control channel (GC-PDCCH) signal.

Example 20 includes the subject matter of Example 17, and optionally, wherein switching includes switching in response to at least one of: satisfaction of a triggering condition to switch; or explicit signaling from the gNodeB.

Example 21 includes the subject matter of Example 20, and optionally, wherein the triggering condition includes a determination as to whether a predetermined number of failed transmission attempts of the first communication to the gNodeB from the wireless apparatus have taken place using the primary PRACH configuration.

Example 22 includes the subject matter of Example 20, and optionally, wherein the explicit signaling is based on remote interference management (RIM) by the gNodeB.

Example 23 includes the subject matter of Example 20, and optionally, wherein the explicit signaling is part of one of: a system information (SI) radio resource control (RRC) message from the gNodeB; a group-common physical downlink control channel (PDCCH) including a downlink control information (DCI) format 2_4; a user equipment-specific (UE-specific) RRC message including a downlink downlink control channel message (DL-DCCH-message); a medium access control control channel (MAC CE); or a UE-specific DCI format.

Example 24 includes the subject matter of Example 23, and optionally, wherein: where the explicit signaling is part of the SI RRC message, the SI RRC message includes an cell-specific indication of a selection as between the primary PRACH configuration and the secondary PRACH configuration; where the explicit signaling is part of the DCI format 2_4, the DCI format 2_4 includes an indication of a selection as between the primary PRACH configuration and the secondary PRACH configuration that is for one user equipment (UE), or for a group of UEs from one or multiple serving cells; where the explicit signaling is part of the DL-DCCH-message, the DL-DCCH message includes a RRC information element (IE) to indicate a cell-specific selection as between the primary PRACH configuration and the secondary PRACH configuration; where the explicit signaling is part of the MAC CE, the MAC CE includes a 1-bit field to indicate a selection as between the primary PRACH configuration and the secondary PRACH configuration; and where the explicit signaling is part of the UE-specific DCI format, the UE-specific DCI format includes a selection as between the primary PRACH configuration and the secondary PRACH configuration for multiple serving cells.

Example 25 includes the subject matter of Example 24, and optionally, further including, where the explicit signaling is part of the DCI format 2_4, decoding a cyclic redundancy check (CRC) based on a secondary random access (SRA) radio network temporary identifier (RNTI) (SRA-RNTI).

Example 26 includes the subject matter of Example 25, and optionally, further including determining the SRA-RNTI from higher layer signaling by the gNodeB.

Example 27 includes the subject matter of Example 17, and optionally, wherein the first signal and the second signal are both part of a cell-specific uplink configuration communication.

Example 28 includes the subject matter of Example 27, and optionally, wherein: for random access by the wireless apparatus in a primary cell (PCell), the second signal is part of an extended remaining minimum system information (RMSI) block (SIB1) sent by the gNodeB; for random access by the wireless apparatus in a serving cell other than the PCell, the second signal is part of a dedicated radio resource control (RRC) signaling sent by the gNodeB; and switching is based on the second signal.

Example 29 includes the subject matter of Example 27, and optionally, wherein the second signal includes information regarding a triggering condition to trigger a switch between the primary PRACH configuration and the secondary PRACH configuration, and switching is based on the triggering condition.

Example 30 includes the subject matter of Example 17, and optionally, further including using the secondary PRACH configuration to encode uplink (UL) slots within a semi-static downlink/uplink (DL/UL) period to avoid interference from remote cells.

Example 31 includes a device of a wireless apparatus, the device including: means for processing a first signal sent by a NR evolved NodeB (gNodeB) regarding a primary physical random access channel (PRACH) configuration to be used to encode for transmission a first communication to the gNodeB; means for processing a second signal sent by the gNodeB regarding a secondary PRACH configuration different from the primary PRACH configuration and to be used to encode for transmission a second communication to the gNodeB; means for determining the primary PRACH configuration from the first signal and the secondary PRACH from the second signal; and means for switching from the primary PRACH configuration to the secondary PRACH configuration and encode for transmission the second communication to the gNodeB based on the secondary PRACH configuration.

Example 32 includes the subject matter of Example 31, and optionally, wherein the gNodeB is an integrated access and backhaul (IAB) parent node, and wherein the wireless apparatus is one of a NR User Equipment (UE) or an IAB child node.

Example 33 includes the subject matter of Example 31, and optionally, wherein the second signal is part of one of a radio resource control (RRC) signal, a system information (SI) signal, or a group-common physical downlink control channel (GC-PDCCH) signal.

Example 34 includes the subject matter of Example 31, and optionally, wherein the means for switching includes a means for switching in response to at least one of: satisfaction of a triggering condition to switch; or explicit signaling from the gNodeB.

Example 35 includes the subject matter of Example 34, and optionally, wherein the triggering condition includes a determination as to whether a predetermined number of failed transmission attempts of the first communication to the gNodeB from the wireless apparatus have taken place using the primary PRACH configuration.

Example 36 includes the subject matter of Example 34, and optionally, wherein the explicit signaling is part of one of: a system information (SI) radio resource control (RRC) message from the gNodeB; a group-common physical downlink control channel (PDCCH) including a downlink control information (DCI) format 2_4; a user equipment-specific (UE-specific) RRC message including a downlink downlink control channel message (DL-DCCH-message); a medium access control control channel (MAC CE); or a UE-specific DCI format.

Example 37 includes a device of a New Radio (NR) evolved Node B (gNodeB), the device including a Radio Frequency (RF) interface, and processing circuitry coupled to the RF interface, the processing circuitry to: encode for transmission to a wireless apparatus a first signal regarding a primary physical random access channel (PRACH) configuration to be used by the wireless apparatus to encode for transmission a first communication to the gNodeB; encode for transmission a second signal to the wireless apparatus regarding a secondary PRACH configuration different from the primary PRACH configuration and to be used by the wireless apparatus to encode for transmission a second communication to the gNodeB; and cause the wireless apparatus to switch from the primary PRACH configuration to the secondary PRACH configuration encoding for transmission the second communication to the gNodeB based on the secondary PRACH configuration.

Example 38 includes the subject matter of Example 37, and optionally, wherein the second communication based on the secondary PRACH configuration is orthogonal to another communication from another wireless apparatus to the gNodeB that at least partially overlaps in time with the second communication.

Example 39 includes the subject matter of Example 37, and optionally, wherein the gNodeB is an integrated access and backhaul (IAB) parent node, and wherein the wireless apparatus is one of a NR User Equipment (UE) or an IAB child node.

Example 40 includes the subject matter of Example 37, and optionally, wherein the second signal is part of one of a radio resource control (RRC) signal, a system information (SI) signal, or a group-common physical downlink control channel (GC-PDCCH) signal.

Example 41 includes the subject matter of Example 37, and optionally, wherein the processing circuitry is to encode for transmission to the wireless apparatus at least one of: information regarding a triggering condition to cause the wireless apparatus to switch from the primary PRACH to the secondary PRACH; or explicit signaling to cause the wireless apparatus to switch from the primary PRACH to the secondary PRACH.

Example 42 includes the subject matter of Example 41, and optionally, wherein the triggering condition includes information regarding a predetermined number of failed transmission attempts of the first communication to the gNodeB from the wireless apparatus using the primary PRACH configuration.

Example 43 includes the subject matter of Example 41, and optionally, wherein the explicit signaling is based on remote interference management (RIM) by the gNodeB.

Example 44 includes the subject matter of Example 41, and optionally, wherein the explicit signaling is part of one of: a system information (SI) radio resource control (RRC) message; a group-common physical downlink control channel (PDCCH) including a downlink control information (DCI) format 2_4; a user equipment-specific (UE-specific) RRC message including a downlink downlink control channel message (DL-DCCH-message); a medium access control control channel (MAC CE); or a UE-specific DCI format.

Example 45 includes the subject matter of Example 44, and optionally, wherein: where the explicit signaling is part of the SI RRC message, the SI RRC message includes an cell-specific indication of a selection as between the primary PRACH configuration and the secondary PRACH configuration; where the explicit signaling is part of the DCI format 2_4, the DCI format 2_4 includes an indication of a selection as between the primary PRACH configuration and the secondary PRACH configuration that is for one user equipment (UE), or for a group of UEs from one or multiple serving cells; where the explicit signaling is part of the DL-DCCH-message, the DL-DCCH message includes a RRC information element (IE) to indicate a cell-specific selection as between the primary PRACH configuration and the secondary PRACH configuration; where the explicit signaling is part of the MAC CE, the MAC CE includes a 1-bit field to indicate a selection as between the primary PRACH configuration and the secondary PRACH configuration; and where the explicit signaling is part of the UE-specific DCI format, the UE-specific DCI format includes a selection as between the primary PRACH configuration and the secondary PRACH configuration for multiple serving cells.

Example 46 includes the subject matter of Example 45, and optionally, wherein, where the explicit signaling is part of the DCI format 2_4, the DCI format 2_4 includes a cyclic redundancy check (CRC) based on a secondary random access (SRA) radio network temporary identifier (RNTI) (SRA-RNTI).

Example 47 includes the subject matter of Example 46, and optionally, wherein the processing circuitry is to encode for transmission to the wireless apparatus the SRA-RNTI based on higher layer signaling.

Example 48 includes the subject matter of Example 37, and optionally, wherein the processing circuitry is to encode a cell-specific uplink configuration communication to the wireless apparatus, the first signal and the second signal both being part of the cell-specific uplink configuration communication.

Example 49 includes the subject matter of Example 48, and optionally, wherein the processing circuitry is to encode for transmission to the wireless apparatus, to cause the wireless apparatus to switch based on the second signal: for random access by the wireless apparatus in a primary cell (PCell), an extended remaining minimum system information (RMSI) block (SIB1) including the second signal; and for random access by the wireless apparatus in a serving cell other than the PCell, a dedicated radio resource control (RRC) signaling including the second signal.

Example 50 includes the subject matter of Example 48, and optionally, wherein the second signal includes information regarding a triggering condition to trigger a switch by the wireless apparatus between the primary PRACH configuration and the secondary PRACH configuration.

Example 51 includes the subject matter of Example 37, and optionally, wherein the processing circuitry is to cause the wireless apparatus to use the secondary PRACH configuration to encode uplink (UL) slots within a semi-static downlink/uplink (DL/UL) period to avoid interference from remote cells.

Example 52 includes the subject matter of any one of Examples 37-51, and optionally, wherein further including a front-end module coupled to the processing circuitry.

Example 53 includes the subject matter of Example 52, and optionally, further including one or more antennas coupled to the front end module to transmit and receive signals to and from the wireless apparatus.

Example 54 includes a method to be used at a device of a New Radio (NR) evolved Node B (gNodeB), the method including: encoding for transmission to a wireless apparatus a first signal regarding a primary physical random access channel (PRACH) configuration to be used by the wireless apparatus to encode for transmission a first communication to the gNodeB; encoding for transmission a second signal to the wireless apparatus regarding a secondary PRACH configuration different from the primary PRACH configuration and to be used by the wireless apparatus to encode for transmission a second communication to the gNodeB; and causing the wireless apparatus to switch from the primary PRACH configuration to the secondary PRACH configuration encoding for transmission the second communication to the gNodeB based on the secondary PRACH configuration.

Example 55 includes the subject matter of Example 54, and optionally, wherein the second communication based on the secondary PRACH configuration is orthogonal to another communication from another wireless apparatus to the gNodeB that at least partially overlaps in time with the second communication.

Example 56 includes the subject matter of Example 54, and optionally, wherein the gNodeB is an integrated access and backhaul (IAB) parent node, and wherein the wireless apparatus is one of a NR User Equipment (UE) or an IAB child node.

Example 57 includes the subject matter of Example 54, and optionally, wherein the second signal is part of one of a radio resource control (RRC) signal, a system information (SI) signal, or a group-common physical downlink control channel (GC-PDCCH) signal.

Example 58 includes the subject matter of Example 54, and optionally, further including encoding for transmission to the wireless apparatus at least one of: information regarding a triggering condition to cause the wireless apparatus to switch from the primary PRACH to the secondary PRACH; or explicit signaling to cause the wireless apparatus to switch from the primary PRACH to the secondary PRACH.

Example 59 includes the subject matter of Example 58, and optionally, wherein the triggering condition includes information regarding a predetermined number of failed transmission attempts of the first communication to the gNodeB from the wireless apparatus using the primary PRACH configuration.

Example 60 includes the subject matter of Example 58, and optionally, wherein the explicit signaling is based on remote interference management (RIM) by the gNodeB.

Example 61 includes the subject matter of Example 58, and optionally, wherein the explicit signaling is part of one of: a system information (SI) radio resource control (RRC) message; a group-common physical downlink control channel (PDCCH) including a downlink control information (DCI) format 2_4; a user equipment-specific (UE-specific) RRC message including a downlink downlink control channel message (DL-DCCH-message); a medium access control control channel (MAC CE); or a UE-specific DCI format.

Example 62 includes the subject matter of Example 61, and optionally, wherein: where the explicit signaling is part of the SI RRC message, the SI RRC message includes an cell-specific indication of a selection as between the primary PRACH configuration and the secondary PRACH configuration; where the explicit signaling is part of the DCI format 2_4, the DCI format 2_4 includes an indication of a selection as between the primary PRACH configuration and the secondary PRACH configuration that is for one user equipment (UE), or for a group of UEs from one or multiple serving cells; where the explicit signaling is part of the DL-DCCH-message, the DL-DCCH message includes a RRC information element (IE) to indicate a cell-specific selection as between the primary PRACH configuration and the secondary PRACH configuration; where the explicit signaling is part of the MAC CE, the MAC CE includes a 1-bit field to indicate a selection as between the primary PRACH configuration and the secondary PRACH configuration; and where the explicit signaling is part of the UE-specific DCI format, the UE-specific DCI format includes a selection as between the primary PRACH configuration and the secondary PRACH configuration for multiple serving cells.

Example 63 includes the subject matter of Example 62, and optionally, wherein, where the explicit signaling is part of the DCI format 2_4, the DCI format 2_4 includes a cyclic redundancy check (CRC) based on a secondary random access (SRA) radio network temporary identifier (RNTI) (SRA-RNTI).

Example 64 includes the subject matter of Example 63, and optionally, further including encoding for transmission to the wireless apparatus the SRA-RNTI based on higher layer signaling.

Example 65 includes the subject matter of Example 54, and optionally, further including encoding for transmission a cell-specific uplink configuration communication to the wireless apparatus, the first signal and the second signal both being part of the cell-specific uplink configuration communication.

Example 66 includes the subject matter of Example 65, and optionally, further including encoding for transmission to the wireless apparatus, to cause the wireless apparatus to switch based on the second signal: for random access by the wireless apparatus in a primary cell (PCell), an extended remaining minimum system information (RMSI) block (SIB1) including the second signal; and for random access by the wireless apparatus in a serving cell other than the PCell, a dedicated radio resource control (RRC) signaling including the second signal.

Example 67 includes the subject matter of Example 65, and optionally, wherein the second signal includes information regarding a triggering condition to trigger a switch by the wireless apparatus between the primary PRACH configuration and the secondary PRACH configuration.

Example 68 includes the subject matter of Example 54, and optionally, further including causing the wireless apparatus to use the secondary PRACH configuration to encode uplink (UL) slots within a semi-static downlink/uplink (DL/UL) period to avoid interference from remote cells.

Example 69 includes a device of a New Radio (NR) evolved Node B (gNodeB), the device including: means for encoding for transmission to a wireless apparatus a first signal regarding a primary physical random access channel (PRACH) configuration to be used by the wireless apparatus to encode for transmission a first communication to the gNodeB; means for encoding for transmission a second signal to the wireless apparatus regarding a secondary PRACH configuration different from the primary PRACH configuration and to be used by the wireless apparatus to encode for transmission a second communication to the gNodeB; and means for causing the wireless apparatus to switch from the primary PRACH configuration to the secondary PRACH configuration encoding for transmission the second communication to the gNodeB based on the secondary PRACH configuration.

Example 70 includes the subject matter of Example 69, and optionally, wherein the second communication based on the secondary PRACH configuration is orthogonal to another communication from another wireless apparatus to the gNodeB that at least partially overlaps in time with the second communication.

Example 71 includes the subject matter of Example 69, and optionally, wherein the gNodeB is an integrated access and backhaul (IAB) parent node, and wherein the wireless apparatus is one of a NR User Equipment (UE) or an IAB child node.

Example 72 includes a machine-readable medium including code which, when executed, is to cause a machine to perform the method of any one of Examples 17-30 and 54-68.

Example 73 includes a product comprising one or more tangible computer-readable non-transitory storage media comprising computer-executable instructions operable to, when executed by at least one computer processor, enable the at least one computer processor to perform the method of any one of Examples 17-30 and 54-68.

Example 74 includes an apparatus comprising means for causing a wireless communication device to perform the method of any one of Examples 17-30 and 54-68.

Example 75 includes a signal as described in or related to any of the examples above, or portions or parts thereof.

Example 76 includes a signal in a wireless network as shown and described herein.

Example 77 includes a method of communicating in a wireless network as shown and described herein.

Example 78 includes a system for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed.

What is claimed is:

1. A user equipment (UE), comprising:
a Radio Frequency (RF) interface, and
a baseband processor configured to:
receive information from a base station indicating a first physical random access channel (PRACH) configuration and a second PRACH configuration different from the first PRACH configuration;

transmit, via the RF interface, a first communication based on the first PRACH configuration; and in response to satisfaction of a triggering condition or explicit signaling from the base station, switch from the first PRACH configuration to the second PRACH configuration; and transmit, via the RF interface, a second communication based on the second PRACH configuration.

2. The UE of claim 1, wherein the base station is an integrated access and backhaul (IAB) parent node, and wherein the UE is one of a NR UE or an IAB child node.

3. The UE of claim 1, wherein the information is received from the base station in one of a radio resource control (RRC) signal, a system information (SI) signal, or a group-common physical downlink control channel (GC-PDCCH) signal.

4. The UE of claim 1, wherein the first PRACH configuration and the second PRACH configuration are both contention-based PRACH configurations.

5. The UE of claim 1, wherein the triggering condition includes a predetermined number of failed transmission attempts of the first communication to the base station using the first PRACH configuration.

6. The UE of claim 1, wherein the explicit signaling is part of one of:
- a system information (SI) radio resource control (RRC) message from the base station;
- a group-common physical downlink control channel (PDCCH) including a downlink control information (DCI) format 2_4;
- a user equipment-specific (UE-specific) RRC message including a downlink downlink control channel message (DL-DCCH-message);
- a medium access control control channel (MAC CE); or
- a UE-specific DCI format.

7. The UE of claim 6, wherein:
the explicit signaling is part of the SI RRC message, the SI RRC message includes an cell-specific indication of a selection as between the first PRACH configuration and the second PRACH configuration;
the explicit signaling is part of the DCI format 2_4, the DCI format 2_4 includes an indication of a selection as between the first PRACH configuration and the second PRACH configuration that is for one user equipment (UE), or for a group of UEs from one or multiple serving cells;
the explicit signaling is part of the DL-DCCH-message, the DL-DCCH message includes a RRC information element (IE) to indicate a cell-specific selection as between the first PRACH configuration and the second PRACH configuration;
the explicit signaling is part of the MAC CE, the MAC CE includes a 1-bit field to indicate a selection as between the first PRACH configuration and the second PRACH configuration; or
the explicit signaling is part of the UE-specific DCI format, the UE-specific DCI format includes a selection as between the first PRACH configuration and the second PRACH configuration for multiple serving cells.

8. The UE of claim 7, wherein the explicit signaling is part of the DCI format 2_4, and the baseband processor is configured to decode a cyclic redundancy check (CRC) based on a secondary random access (SRA) radio network temporary identifier (RNTI) (SRA-RNTI).

9. The UE of claim 1, wherein the information includes information regarding a triggering condition to trigger a switch between the first PRACH configuration and the second PRACH configuration, and the baseband processor is configured to switch based on the triggering condition.

10. The UE of claim 1, wherein the baseband processor is configured to use the second PRACH configuration to encode uplink (UL) slots within a semi-static downlink/uplink (DL/UL) period to avoid interference from remote cells.

11. A method, comprising:
receiving information from a base station indicating a first physical random access channel (PRACH) configuration and;

a second PRACH configuration different from the first PRACH configuration;

transmitting a first communication based on the first PRACH configuration;

in response to satisfaction of a triggering condition or explicit signaling from the base station switching from the first PRACH configuration to the second PRACH configuration; and transmitting a second communication based on the second PRACH configuration.

12. The method of claim 11, wherein first PRACH configuration and the second PRACH configuration are both contention-based PRACH configurations.

13. The method of claim 12, wherein the triggering condition includes a predetermined number of failed transmission attempts of the first communication to the base station have taken place using the first PRACH configuration.

14. The method of claim 12, wherein the explicit signaling is part of one of:
- a system information (SI) radio resource control (RRC) message from the base station;
- a group-common physical downlink control channel (PDCCH) including a downlink control information (DCI) format 2_4;
- a user equipment-specific (UE-specific) RRC message including a downlink downlink control channel message (DL-DCCH-message);
- a medium access control control channel (MAC CE); or
- a UE-specific DCI format.

15. The method of claim 14, wherein:
where the explicit signaling is part of the SI RRC message, the SI RRC message includes an cell-specific indication of a selection as between the first PRACH configuration and the second PRACH configuration;
where the explicit signaling is part of the DCI format 2_4, the DCI format 2_4 includes an indication of a selection as between the first PRACH configuration and the second PRACH configuration that is for one user equipment (UE), or for a group of UEs from one or multiple serving cells;
where the explicit signaling is part of the DL-DCCH-message, the DL-DCCH message includes a RRC information element (IE) to indicate a cell-specific selection as between the first PRACH configuration and the second PRACH configuration;
where the explicit signaling is part of the MAC CE, the MAC CE includes a 1-bit field to indicate a selection as between the first PRACH configuration and the second PRACH configuration; or
where the explicit signaling is part of the UE-specific DCI format, the UE-specific DCI format includes a selection as between the first PRACH configuration and the second PRACH configuration for multiple serving cells.

16. The method of claim 15, further including, where the explicit signaling is part of the DCI format 2_4, decoding a cyclic redundancy check (CRC) based on a secondary random access (SRA) radio network temporary identifier (RNTI) (SRA-RNTI).

17. The method of claim 16, further including determining the SRA-RNTI from higher layer signaling by the base station.

18. A baseband processor configured to perform operations, the operations comprising receiving information from a base station indicating a first physical random access channel (PRACH) configuration and;

a second PRACH configuration different from the first PRACH configuration;

instructing a transceiver to transmit a first communication based on the first PRACH configuration;

in response to satisfaction of a triggering condition or explicit signaling from the base station switching from the first PRACH configuration to the second PRACH configuration; and instructing the transceiver to transmit a second communication based on the second PRACH configuration.

19. The baseband processor of claim 18, wherein the base station is an integrated access and backhaul (IAB) parent node, and wherein the baseband processor is associated with one of a NR User Equipment (UE) or an IAB child node.

20. The baseband processor of claim 18, wherein the triggering condition includes a predetermined number of failed transmission attempts of the first communication to the base station using the first PRACH configuration.

21. The baseband processor of claim 18, wherein the first PRACH configuration and the second PRACH configuration are both contention-based PRACH configurations.

* * * * *